| (12) | United States Patent | (10) Patent No.: | US 7,558,080 B2 |
|---|---|---|---|
| | Chen et al. | (45) Date of Patent: | Jul. 7, 2009 |

(54) POWER CONVERTER SYSTEM

(75) Inventors: Baoxing Chen, Westford, MA (US); Ronn Kliger, Lexington, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/335,409

(22) Filed: Jan. 19, 2006

(65) Prior Publication Data

US 2006/0120115 A1     Jun. 8, 2006

Related U.S. Application Data

(63) Continuation-in-part of application No. 10/922,504, filed on Aug. 20, 2004, now Pat. No. 7,489,526.

(51) Int. Cl.
   *H02M 3/335*   (2006.01)
   *H02M 7/516*   (2007.01)

(52) U.S. Cl. .......................................... 363/17; 363/98

(58) Field of Classification Search ............. 363/15–17, 363/21.07, 21.15, 22, 23, 98, 132; 331/117 FE
   See application file for complete search history.

(56) References Cited

U.S. PATENT DOCUMENTS

| 4,065,713 | A | | 12/1977 | Pollmeier | |
|---|---|---|---|---|---|
| 4,318,170 | A | * | 3/1982 | Cabalfin | ...................... 363/133 |
| 4,443,839 | A | * | 4/1984 | Onodera et al. | ................ 363/20 |
| 4,475,149 | A | * | 10/1984 | Gallios | ......................... 363/17 |
| 4,785,345 | A | | 11/1988 | Rawls et al. | |
| 4,912,617 | A | | 3/1990 | Hartmann et al. | |
| 4,920,474 | A | * | 4/1990 | Bruning et al. | ................ 363/97 |
| 5,327,030 | A | | 7/1994 | Devito et al. | |
| 5,329,225 | A | | 7/1994 | Roshen et al. | |
| 5,339,061 | A | | 8/1994 | Reick | |
| 5,394,319 | A | | 2/1995 | Attwood et al. | |
| 5,636,110 | A | * | 6/1997 | Lanni | ...................... 363/21.08 |
| 5,774,350 | A | * | 6/1998 | Notaro et al. | ................. 363/89 |
| 5,998,979 | A | * | 12/1999 | Nilsson | ...................... 323/273 |
| 6,025,705 | A | | 2/2000 | Nguyen et al. | |
| 6,040,986 | A | | 3/2000 | Sakamoto et al. | |
| 6,208,531 | B1 | | 3/2001 | Vinciarelli et al. | |
| 6,266,254 | B1 | * | 7/2001 | Ohtake | ....................... 363/22 |

(Continued)

FOREIGN PATENT DOCUMENTS

EP     0708529 A2     4/1996

(Continued)

OTHER PUBLICATIONS

S.C. Tang, et al., "A Low-Profile Low-Power Converter with Coreless PCB Isolation Transformer." IEEE Transactions on Power Electronics, May 2001, 311-315, vol. 16. No. 3.

(Continued)

*Primary Examiner*—Gary L Laxton
(74) *Attorney, Agent, or Firm*—Kenyon & Kenyon LLP (57) ABSTRACT

A power converter system including an LC oscillator circuit, an oscillator drive circuit for driving the LC oscillator circuit, a rectifier circuit coupled to the LC oscillator circuit for providing a DC output, and a switching circuit for controlling the duty cycle of the oscillator drive circuit to modulate the power in the LC oscillator circuit and the rectifier circuit.

53 Claims, 11 Drawing Sheets

U.S. PATENT DOCUMENTS

| | | | |
|---|---|---|---|
| 6,291,907 B1 | 9/2001 | Haogh et al. | |
| 6,317,338 B1 | 11/2001 | Boys | |
| 6,344,979 B1 | 2/2002 | Huang et al. | |
| 6,504,732 B2 * | 1/2003 | Abe | 363/17 |
| 6,538,532 B2 | 3/2003 | Petrovic | |
| 6,542,385 B1 * | 4/2003 | Emmons et al. | 363/17 |
| 6,603,383 B2 | 8/2003 | Gevorgian et al. | |
| 6,606,260 B2 | 8/2003 | Ahlstrom | |
| 6,621,365 B1 | 9/2003 | Hallivuori et al. | |
| 6,738,240 B1 * | 5/2004 | Ahn et al. | 361/38 |
| 6,765,809 B2 * | 7/2004 | Komori | 363/19 |
| 6,911,848 B2 | 6/2005 | Vinciarelli | |
| 6,927,662 B2 | 8/2005 | Kahlmann et al. | |
| 6,993,087 B2 | 1/2006 | Rosnell et al. | |
| 7,075,329 B2 | 7/2006 | Chen et al. | |
| 7,098,766 B2 | 8/2006 | Gardner et al. | |
| 7,171,739 B2 | 2/2007 | Yang et al. | |
| 7,199,562 B2 * | 4/2007 | Muterspaugh | 323/235 |
| 2003/0042571 A1 | 3/2003 | Chen | |
| 2004/0184289 A1 | 9/2004 | Vinciarelli | |

FOREIGN PATENT DOCUMENTS

EP            0708529        4/1998

OTHER PUBLICATIONS

DC-DC Converters: A Primer, Jaycar Electronics Reference Data Sheet: DCDCONV.PDF 2001 5 pgs.
DC-DC Converter Basics, Power Designers, pp. 1-11, www.powerdesigners.com/infoweb/design_center/articles/DC-DC/converter.shtm.
"An Electric Pendulum", AC, Jul. 12, 2004, pp. 1-5. Chapter 6: Resonance, vol. II, www.allaboutcircuits.com.

* cited by examiner

POWER CONVERTER SYSTEM

RELATED APPLICATIONS

This application is a Continuation-in-Part application of U.S. patent application Ser. No. 10/922,504, filed Aug. 20, 2004, now U.S. Pat. No. 7,489,526 entitled "Power and Information Signal Transfer Using Micro-Transformers", incorporated by reference herein.

FIELD OF THE INVENTION

This invention relates generally to isolated power converter systems and more particularly to an improved power converter system that transfers power across an isolation barrier using micro-transformers disposed on an integrated circuit chip.

BACKGROUND OF THE INVENTION

Conventional isolated power converter systems typically rely on a discrete transformer with a magnetic core and discrete diodes in a rectifier circuit to transfer power across an isolation barrier. However, the size of the magnetic core of the transformer prevents the power converter system from being disposed on an integrated circuit chip. Micro-transformers that are small in size and can be disposed on a chip, e.g., "air-core" transformers are often used to transfer data across isolation barriers. Examples of such micro-transformers are disclosed in U.S. Pat. No. 6,291,907, and U.S. patent application Ser. No. 10/214,883 filed on Aug. 8, 2002 and published as U.S. Publication No. 2003/0042571 on Mar. 6, 2003, both by the commonly assigned entity and one inventor hereof, and hereby incorporated by reference herein. However, conventional power converter systems do not employ micro-transformers to transfer power across an isolation barrier because they cannot generate sufficient high frequencies to prevent micro-transformers from saturating. Conventional isolated power converter systems also suffer from significant switching losses at high frequencies. To overcome the aforementioned problems, conventional power conversion systems require complex, expensive, inefficient, unreliable, and not easily repeatable designs that are too large to fit on an integrated circuit chip.

BRIEF SUMMARY OF THE INVENTION

It is therefore an object of this invention to provide an improved power converter system.

It is a further object of this invention to provide such a power converter system which utilizes micro-transformers.

It is a further object of this invention to provide such a power converter system which is disposed on an integrated circuit chip.

It is a further object of this invention to provide such a power converter system which utilizes less chip space.

It is a further object of this invention to provide such a power converter system which is less complex.

It is a further object of this invention to provide such a power converter system which is less expensive.

It is a further object of this invention to provide such a power converter system which reduces switching losses.

It is a further object of this invention to provide such a power converter system which is more reliable.

It is a further object of this invention to provide such a power converter system which is easily repeatable.

It is a further object of this invention to provide such a power converter system which is more efficient.

This invention results from the realization that an improved power converter system that utilizes micro-transformers and can be disposed on an integrated circuit chip is achieved with an efficient LC oscillator circuit that provides sufficient high frequency to prevent saturation of the micro-transformer and reduces switching losses, a rectifier circuit coupled to the LC oscillator circuit that provides the DC output, an oscillator drive circuit that drives the LC oscillator circuit, and a switching circuit, typically driven by frequency pulse width modulation signals or input data signals, that enables and disables the oscillator drive circuit so that the LC oscillator circuit modulates power to the rectifier circuit.

The subject invention, however, in other embodiments, need not achieve all these objectives and the claims hereof should not be limited to structures or methods capable of achieving these objectives.

This invention features a power converter system including an LC oscillator circuit. An oscillator drive circuit drives the LC oscillator circuit. A rectifier circuit is coupled to the LC oscillator circuit for providing a DC output. A switching circuit controls the duty cycle of the oscillator drive circuit to modulate the power in the LC oscillator circuit to the rectifier circuit.

In one embodiment, the capacitance of the LC oscillator circuit may include the parasitic capacitance of the oscillator drive circuit. The oscillator drive circuit may include a pair of cross-coupled positive feedback switches. The rectifier circuit may include a rectifier. The rectifier circuit may include a capacitor filter. The switching circuit may be driven in response to the output from the rectifier circuit. The rectifier circuit may be coupled to the LC oscillator circuit by a transformer having a primary winding connected to the oscillator drive circuit and a secondary winding connected to the rectifier circuit. The transformer may be an isolation transformer. The transformer may be a micro-transformer. The micro-transformer, the LC oscillator circuit, the oscillator drive circuit, and the switching circuit may be on an integrated circuit chip. The micro-transformer and the rectifier circuit may be on an integrated circuit chip. The micro-transformer may be an air-core micro-transformer. The micro-transformer may have at least one winding formed over a substrate. The LC oscillator circuit may operate at its resonant frequency. The oscillator drive circuit may include two pairs of cross-coupled, positive feedback switches.

This invention also features a power converter system including an LC oscillator circuit. An oscillator drive circuit drives the LC oscillator circuit. A transformer includes a primary winding that includes the inductance of the LC oscillator circuit. A switching circuit controls the duty cycle of the oscillator drive circuit to modulate the power in the LC oscillator circuit and a secondary winding of the transformer.

In one embodiment, the capacitance of the LC oscillator circuit may include the parasitic capacitance of the oscillator drive circuit. The oscillator drive circuit may include a pair of cross-coupled positive feedback switches. The system may further include a rectifier circuit coupled to the secondary winding of the transformer. The rectifier circuit may include a capacitor filter. The switching circuit may be driven in response to the output from the rectifier circuit. The transformer may be an isolation transformer. The transformer may be a micro-transformer and the micro-transformer. The LC oscillator circuit, the oscillator drive circuit and the switching circuit may be on an integrated circuit chip. The micro-transformer may be an air-core micro-transformer. The micro-transformer may have at least one winding formed over a substrate. The LC oscillator circuit may operate at its resonant frequency. The oscillator drive circuit may include two pairs of cross-coupled positive feedback switches. The switching circuit may be responsive to an input data signal. The power converter system may further include a feedback circuit coupled between the secondary winding of the transformer and the switching circuit. The feedback circuit may be coupled to the secondary winding through the rectifier circuit. The feedback circuit may include a comparator circuit for comparing the output of the rectifier circuit with a reference signal to determine fluctuations in the rectifier circuit output. The feedback circuit may also include a second transformer. The second transformer may be an isolation transformer. The second transformer may also be a micro-transformer and the second transformer may be on an integrated circuit chip. The second micro-transformer may be an air-core micro-transformer. The second micro-transformer may have at least one winding formed over a substrate. The second micro-transformer may include an encoder responsive to the input data signal connected between the output of the comparator circuit and a primary winding of the second transformer and a decoder connected between a secondary winding of the second transformer and the switching circuit. The feedback circuit may include a fixed frequency pulse width modulator generator. The micro-transformer may include a center tap secondary winding connected to the rectifier. The rectifier may be a multi-level rectifier. The system may further include a signal isolation circuit having a second transformer responsive to an input data signal. The system may further include a feedforward driver circuit for determining a predetermined output voltage based on the frequency of the input signal and enabling the switching circuit for a predetermined amount of time required to achieve the predetermined output voltage. The input data signal may include a FET signal. The second transformer may be an isolation transformer. The second transformer may be a micro-transformer. The second micro-transformer may have at least one winding formed over a substrate. The second micro-transformer may be an air-core micro-transformer. The signal isolator circuit may include an encoder responsive to the input data signal connected to a primary winding of the second transformer and a decoder connected to a secondary winding of the second transformer and a comparator. The switching circuit may be driven by an input data signal that is transferred to the secondary winding of the transformer. The system may include a linear regulator circuit connected to the output of the rectifier. The linear regulator may include a comparator for comparing the output voltage to a predetermined reference voltage and a switch responsive to the comparator to regulate the output voltage. The power converter system may be non-isolated.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
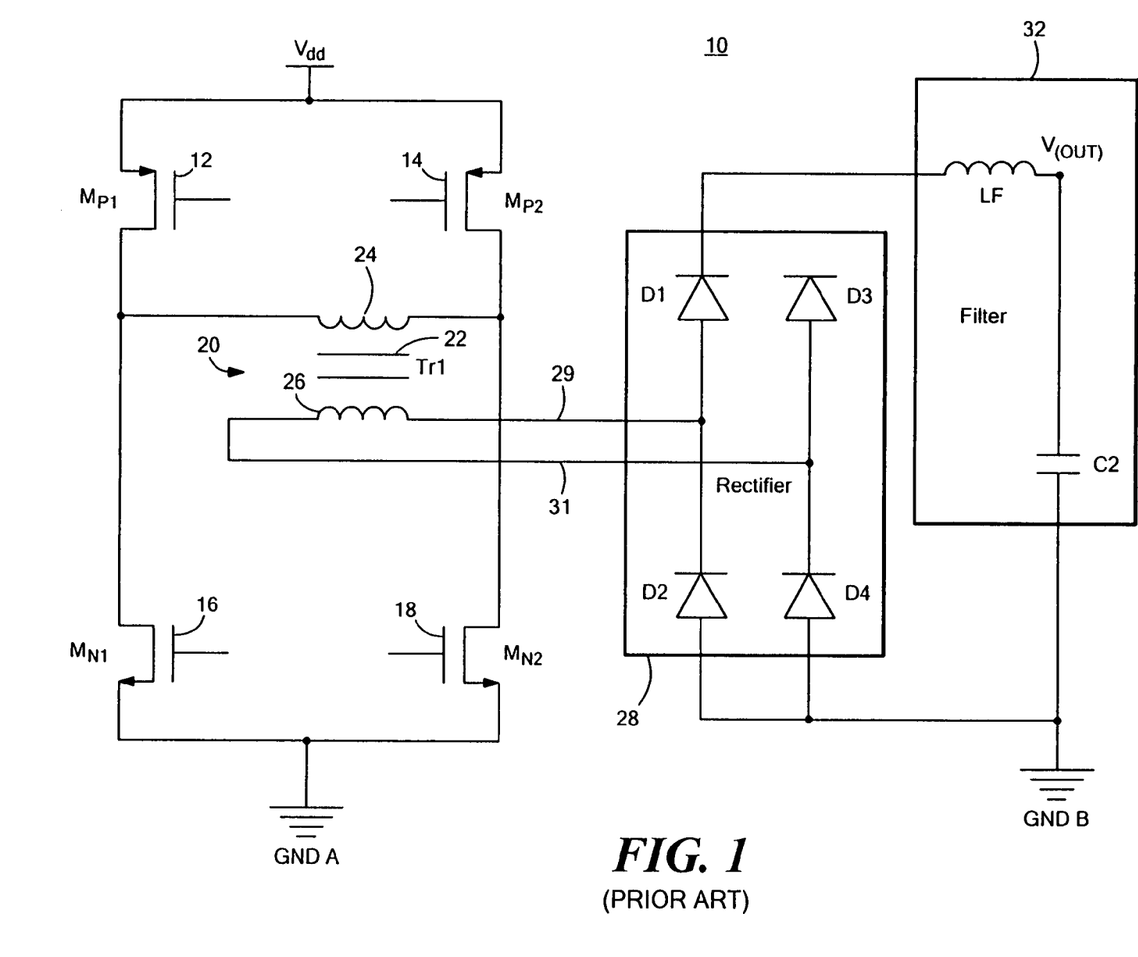
FIG. 1 is a circuit diagram of a typical prior art isolated power converter system.

Conventional isolated power conversion system 10, FIG. 1, typically includes switches 12 ($M_{P1}$), 14 ($M_{P2}$), 16 ($M_{N1}$) and 18 ($M_{N2}$) that drive discrete transformer 20. Transformer 20 includes magnetic core 22 (Tr1), primary winding 24 and secondary winding 26. System 10 includes full bridge rectifier circuit 28 and filter 32 coupled to secondary winding 26 by lines 29 and 31 that provide DC output. As discussed in the Background section above, magnetic core 22 of transformer 20 is too large to be disposed on an integrated circuit chip.

In operation, switches 12 ($M_{P1}$) and 18 ($M_{N2}$) are on for a first pre-selected amount of time, DT, where D is a constant that is a function of the output voltage to the input voltage and T is the period. Then switches 16 ($M_{N1}$) and 18 ($M_{N2}$) are on for a second pre-selected amount of time, e.g., (1−D)T, to complete half the cycle. Thereafter, switches 14 ($M_{P2}$) and 16 ($M_{N1}$) are on for a second time duration equal to DT and then switches 12 ($M_{P1}$) and 14 ($M_{P2}$) are on to complete the cycle. The voltage or power transfer of conventional isolated power conversion system 10 is determined by the control of the constant D, as power is transferred only during the two DT periods. The second half is necessary because during the first DT not only is the current delivered to the load, but also additional current is drawn to charge the magnetizing inductance. The magnetizing inductance gets discharged in the second DT. Micro-transformers typically have small inductance (L), high series resistance (R), and thus small L/R. Therefore DT of prior art system 10 needs to be shorter than L/R otherwise the micro-transformers will get current saturated because of IR voltage drop across the series resistance. However, conventional isolated power converter system 10 cannot generate sufficient high frequency to prevent micro-transformers from being saturated. Moreover, as switches 12-18 switch at high frequencies, there are significant switching losses. As DT gets smaller and the frequency increases, prior art system 10 must have a more complex design which is unreliable, not easily repeatable, expensive, and too large to fit on an integrated circuit chip.

Figure 2:
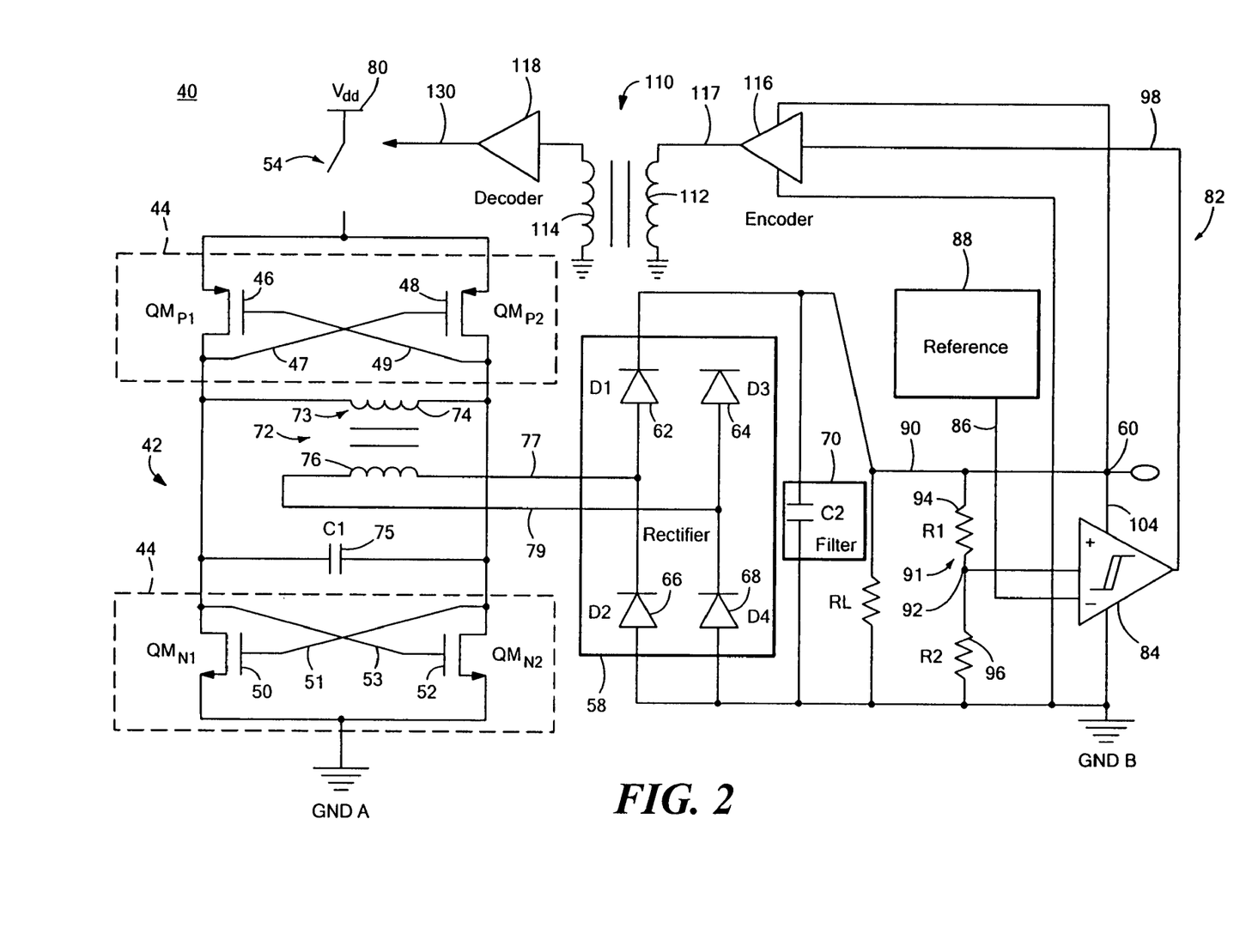
FIG. 2 is a circuit diagram of one embodiment of the power converter system of this invention.

Power converter system 40, FIG. 2, of this invention overcomes the problems associated with conventional isolated power converter systems by employing an LC oscillator circuit that provides sufficient high frequencies to prevent saturation of the micro-transformer and switching losses. The LC oscillator circuit is driven by an oscillator drive circuit that is responsive to a switching circuit that selectively enables and disables the oscillator drive circuit so that the LC oscillator circuit efficiently and effectively modulates power to the rectifier circuit.

Power converter system 40 of this invention includes LC oscillator circuit 42 with inductance 73 connected in parallel with capacitor 75 (C1). System 40 ideally includes micro-transformer 72 that includes primary winding 74 and secondary winding 76. Preferably, primary winding 74 includes inductance 73 of LC oscillator circuit 42. Ideally, micro-transformer 72 includes at least one winding formed over a substrate, e.g., micro-transformer 72 is an air-core micro-transformer as discussed supra. LC oscillator circuit 42 operates at a very high frequencies, e.g., in the range of about 10 MHz to 100 MHz, and preferably at its resonant frequency to prevent saturation of micro-transformer 72 and switching losses (discussed below). Oscillator drive circuit 44 includes switch 46 ($QM_{P1}$) and switch 48 ($QM_{P2}$), e.g., PMOS or NMOS type devices, and drives LC oscillator circuit 42. Switches 46 ($QM_{P1}$) and 48 ($QM_{P2}$) are typically configured in cross-coupled positive feedback by lines 47 and 49. In a preferred design, oscillator drive circuit 44 also includes switch 50 ($QM_{N1}$) and switch 52 ($QM_{N2}$), similarly connected in cross-coupled feedback by lines 51 and 53 that drive oscillator drive circuit 44. Rectifier circuit 58 with diodes 62, 64, 66, and 68 is coupled to LC oscillator circuit 42, e.g., to secondary winding 76 of micro-transformer 72, by lines 77 and 79, and provides DC output by line 90 to node 60. Rectifier circuit 58 may include capacitive filter 70.

Switching circuit 54 is connected to an input voltage, e.g., Vdd 80, and is responsive to pulse width modulation (PWM) by line 130 to control the duty cycle of oscillator drive circuit 44 to modulate the power in LC oscillator circuit 42 to rectifier circuit 58. The pulse width modulation (PWM) signals on line 130 applied to switching circuit 54 are preferably from the output of rectifier circuit 58 (discussed below). Switching circuit 54 controls oscillator drive circuit 44 to determine when and how long LC oscillator circuit 42 is enabled or disabled. Therefore, power is always at maximum efficiency and the average power modulated is controlled by the average of the on time of LC oscillator circuit 42. Hence, LC oscillator circuit 42 is enabled and oscillates when the output voltage is low and is disabled when the output voltage is too high (discussed below).

The capacitance of LC oscillator circuit 42 typically includes capacitor 75 (C1) and the parasitic capacitance of oscillator drive circuit 44, e.g., the capacitance associated with each of switches 46 ($QM_{P1}$) and 48 ($QM_{P2}$) and/or switches 50 ($QM_{N1}$) and 52 ($QM_{N2}$). In a preferred design, micro-transformer 72, LC oscillator circuit 42, oscillator drive circuit 44 and switching circuit 54 are disposed on an integrated chip.

The result is that power converter system 40 of this invention provides sufficient high frequency to prevent micro-transformer 72 from saturating, and reduces switching losses of switches 46 ($QM_{P1}$) and 48 ($QM_{P2}$), and/or switches 50 ($QM_{N1}$) and 52 ($QM_{N2}$). System 40 is less complex in design and therefore more reliable, efficient, easily repeatable, uses less chip space, and less expensive than conventional power systems. System 40 is typically disposed on an integrated circuit chip.

Power converter system 40 preferably includes feedback circuit 82 coupled between secondary winding 76 of micro-transformer 72 and switching circuit 54. Voltage divider circuit 91 includes resistors 94 and 96 that scale the output voltage on line 90 for input to comparator 84. Comparator 84 compares the scaled down output voltage at node 92 to a reference voltage on line 86 generated by reference source device 88. When voltage at node 92 is less than the reference voltage on line 86, comparator 84 enables switching circuit 54. Switching circuit 54 controls the duty cycle of oscillator drive circuit 44 to enable LC oscillator circuit 42 to modulate the power from primary winding 74 to secondary winding 76 coupled to rectifier circuit 58. As a result, rectifier circuit 58 and filter 70 will increase the output voltage by line 90 to node 60. Similarly, when the voltage at node 92 is greater than the reference voltage on line 86, comparator 84 disables switching circuit 54. As a result, oscillator drive circuit 44 will no longer drive LC oscillator circuit 42 and the output voltage generated by rectifier circuit 58 will decrease (discussed in detail below).

Feedback circuit 82 preferably includes second micro-transformer 110, e.g., an air-core micro-transformer as discussed supra, that allows the output of comparator 84 to pass across the isolation barrier. Micro-transformer 110 includes primary winding 112 and secondary winding 114. Encoder 116 is connected to primary winding by line 117 and is responsive to the output of comparator 84 by line 98. Decoder 118 is connected to secondary winding by line 119. Comparator 84, encoder 116, micro-transformer 110, and decoder 118 together generate low frequency pulse width modulation signals on line 132 that control switching circuit 54.

The operation of power converter system 40 and feedback circuit 82 is described below with reference to the waveforms in FIG. 3. An example of the voltage output at node 60, FIG. 2, is shown by output voltage signal 115, FIG. 3. Comparator 84 compares the scaled output voltage at node 92 with the predetermined reference voltage, e.g., 5 volts, indicated at 121, FIG. 3. When the output voltage falls below the predetermined reference voltage, shown at 113, comparator 84 generates logical high 122 of comparator output signal 120. Logic high 122 causes encoder 116 to generate dual pulses 124 of encoded signal 125. Dual pulses 124 are provided to primary winding 112 of transformer 110 and transferred to secondary winding 114. Decoder 118 is responsive to dual pulses 124 of encoded signal 125 and generates logical low 143 of decoded signal 140 that controls switching circuit 54. The logical low generated by decoder 118 closes switching circuit 54. When switching circuit 54 is closed, oscillator drive circuit 44 enables LC oscillator circuit 42. As a result, LC oscillator circuit 42 generates high frequency, e.g., 10-100 MHz, oscillating signals on primary winding 74 of micro-transformer 72, as shown by pulse train 152 of primary oscillating signal 150. The high frequency oscillating signals on primary winding 74 are provided to secondary winding 76, as shown by pulse train 156 of secondary oscillating signal 154. As long as the output voltage remains below the predetermined reference voltage, LC oscillator circuit 42 continues to generate high frequency pulse train 152 so that the power in LC oscillator circuit 42 is modulated to secondary winding 76 of micro-transformer 72 and rectifier circuit 58. Rectifier circuit 58 will increase the output voltage at node 60 until it exceeds the predetermined reference voltage, indicated at 126 on output voltage signal 115.

Figure 3:
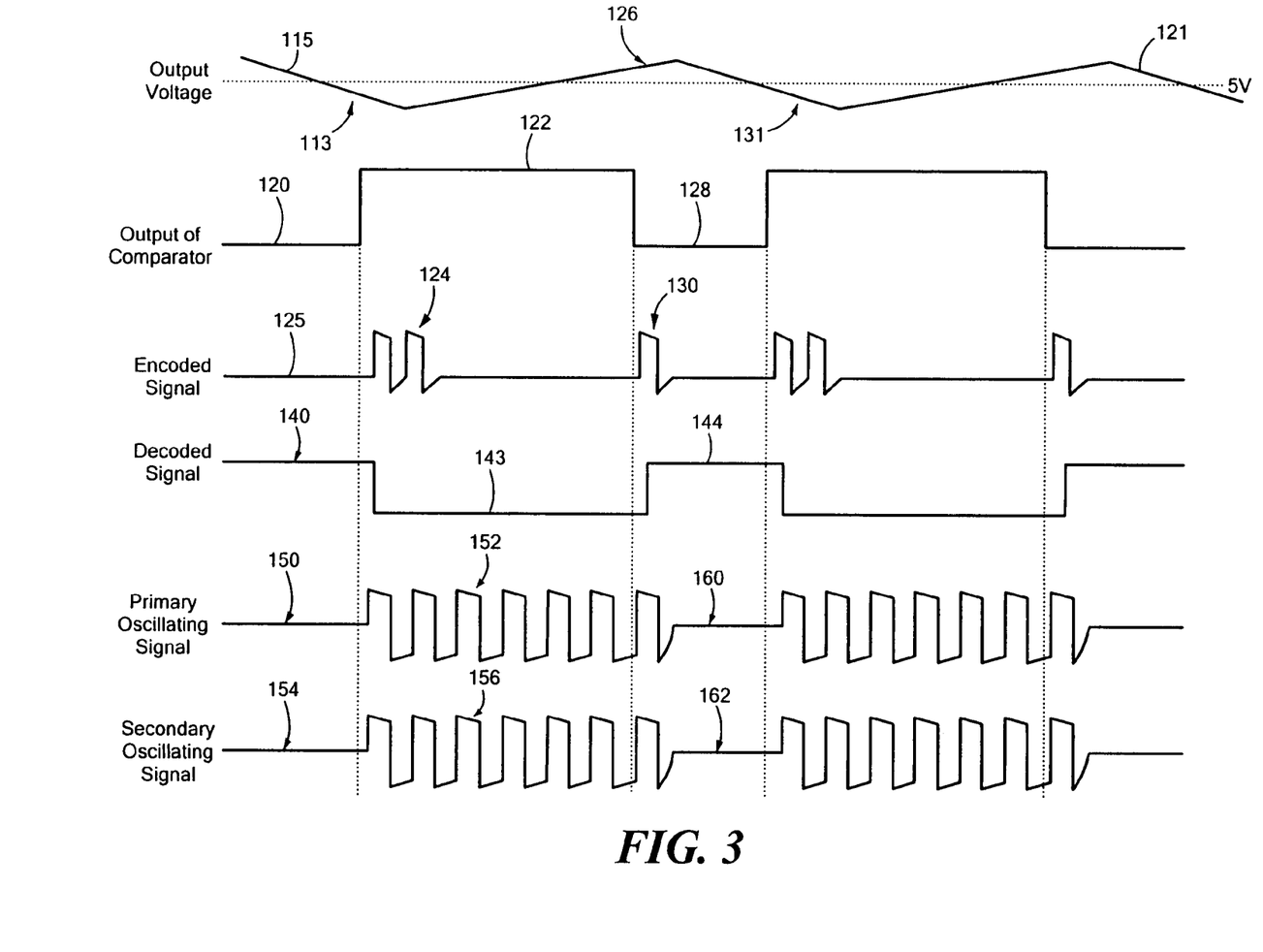
FIG. 3 shows various waveforms generated by the power converter system shown in FIG. 2.

When the output voltage at node 60, FIG. 2 goes above the predetermined reference voltage, indicated at 126, FIG. 3 comparator 84, FIG. 2 generates logical low 128 of comparator output signal 120 that is input to encoder 116. Logical low 128 causes encoder 116 to output single pulse 130 of encoded signal 125. Single pulse 130 generated by encoder 116 causes decoder 118 to generate logical high 144 of decoded signal 140. Logical high 144 disables (opens) switching circuit 54. When switching circuit 54 is open, oscillator drive circuit 44 no longer drives LC oscillator circuit 42. As a result, LC oscillator circuit 42 no longer generates oscillating signals on primary winding 74, shown at 160, of primary oscillating signal 150. As a result, secondary winding 76 no longer receives the oscillating signals, indicated at 162 and the output voltage at node 60 is reduced, as shown at 131.

Figure 4:
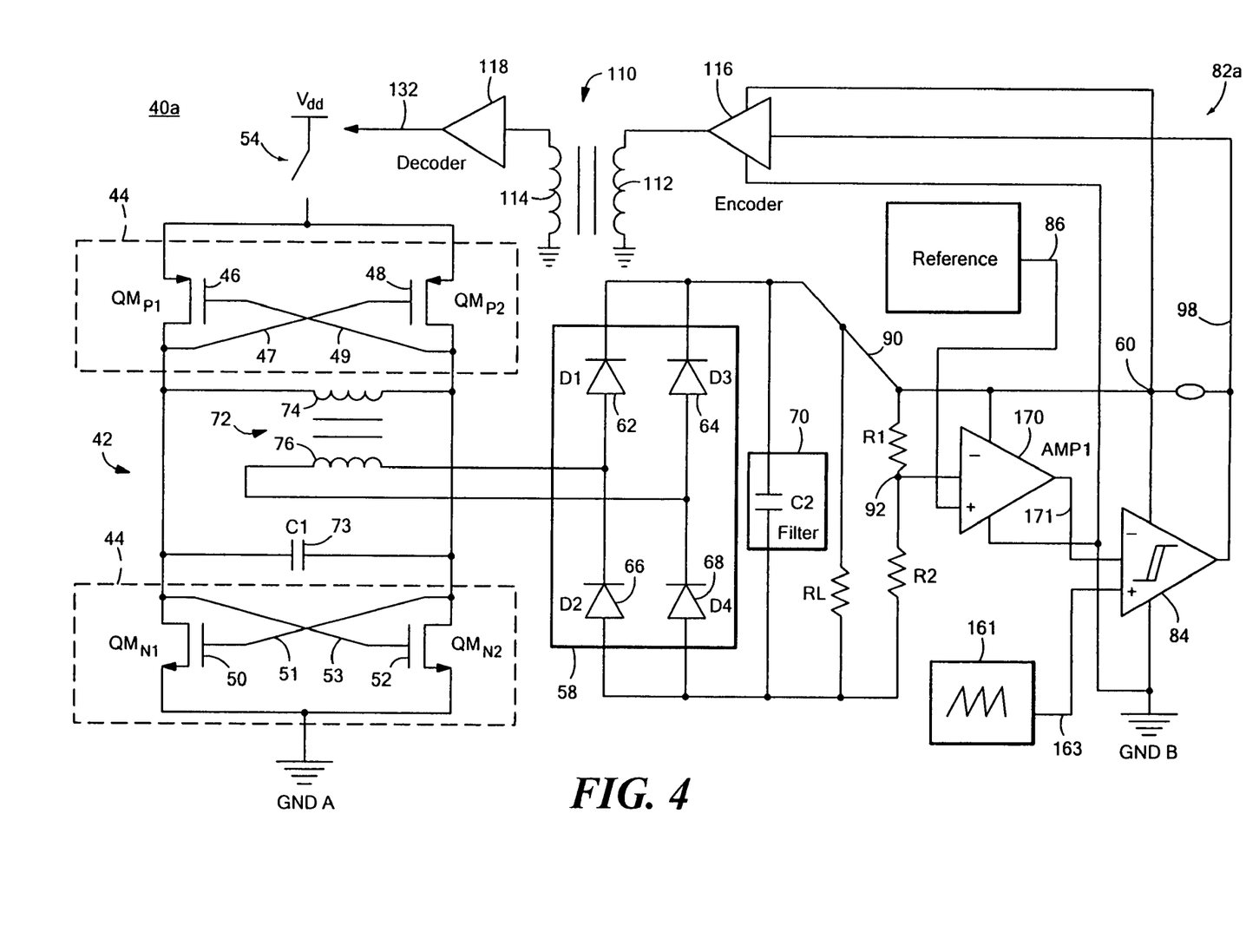
FIG. 4 is a circuit diagram of another embodiment of the power converter system of this invention employing a pulse width modulation generator in the feedback circuit.

Power converter system 40a, FIG. 4, where like parts have been given like numbers, includes feedback circuit 82a that generates the fixed frequency pulse width modulation signal to drive switching circuit 54 by comparing an amplified error voltage on line 171 with a saw-wave signal on line 163. In this design, saw-wave generator 161 outputs saw-tooth signals by line 163 that are input to comparator 84. Amplifier 170 amplifies the scaled output voltage at node 92 and the predetermined reference voltage on line 86 to generate an amplifier error voltage signal on line 171. Comparator 84 compares the error voltage signal on line 171 to saw-wave generated signal on line 163 to generate the fixed frequency pulse width modulated signal on line 98 that is input to encoder 116. Encoder 116, micro-transformer 110 and decoder 118 function similarly as described above to generate the low frequency pulse width modulation signal on line 132 that controls switching circuit 54.

Figure 5:
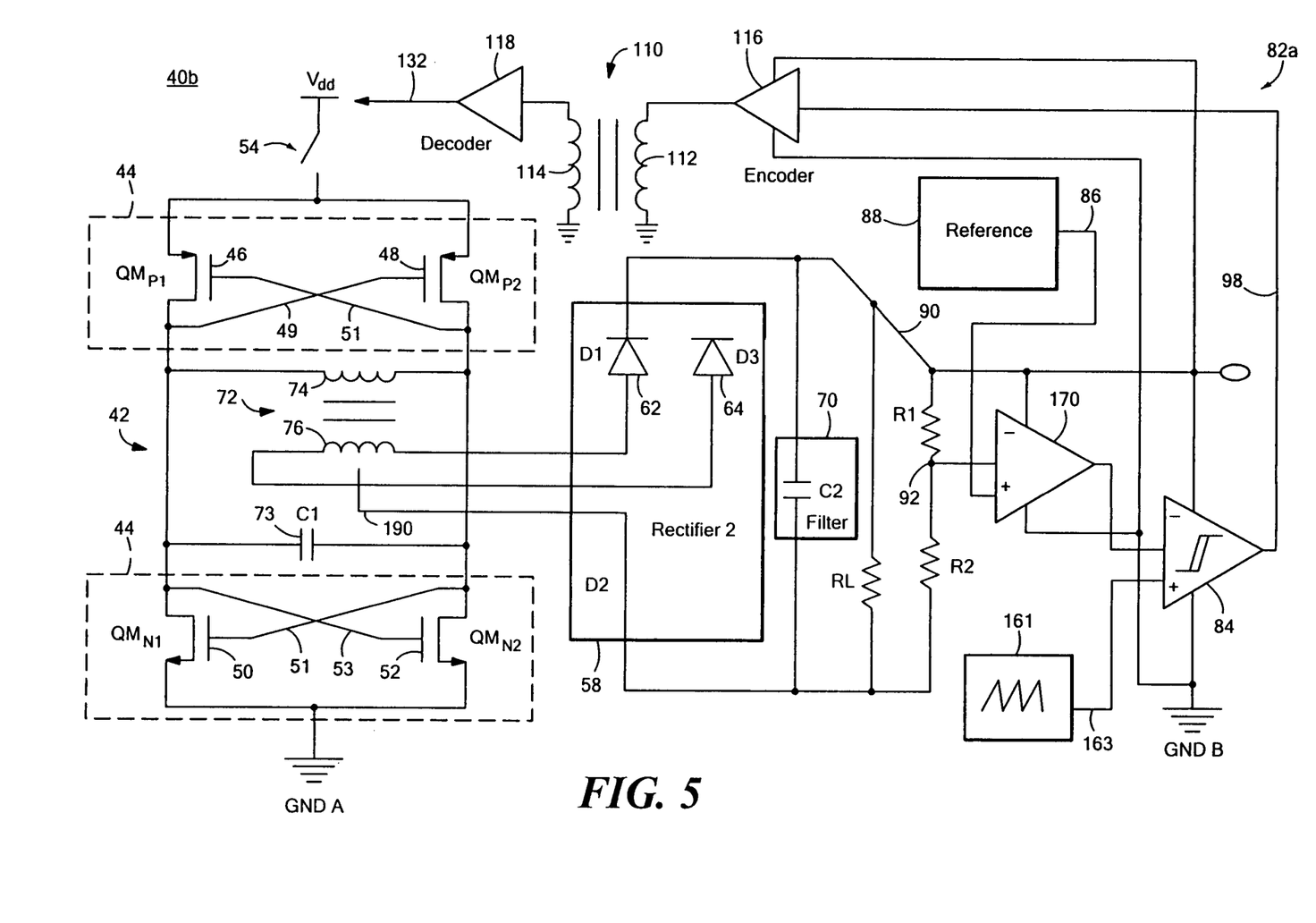
FIG. 5 is a circuit diagram of another embodiment of the power converter system of this invention similar to the system shown in FIG. 4 in which the secondary winding of the micro-transformer is center-tapped.

Power converter system 40b, FIG. 5 where like parts have been given like numbers, is of similar design as power converter system 40a except in this example secondary winding 76 of micro-transformer 72 is center tapped at 190 and coupled to rectifier circuit 58 and to node 92. Rectifier circuit 58 is a half bridge rectifier and includes only diodes 62 and 64.

Figure 6:
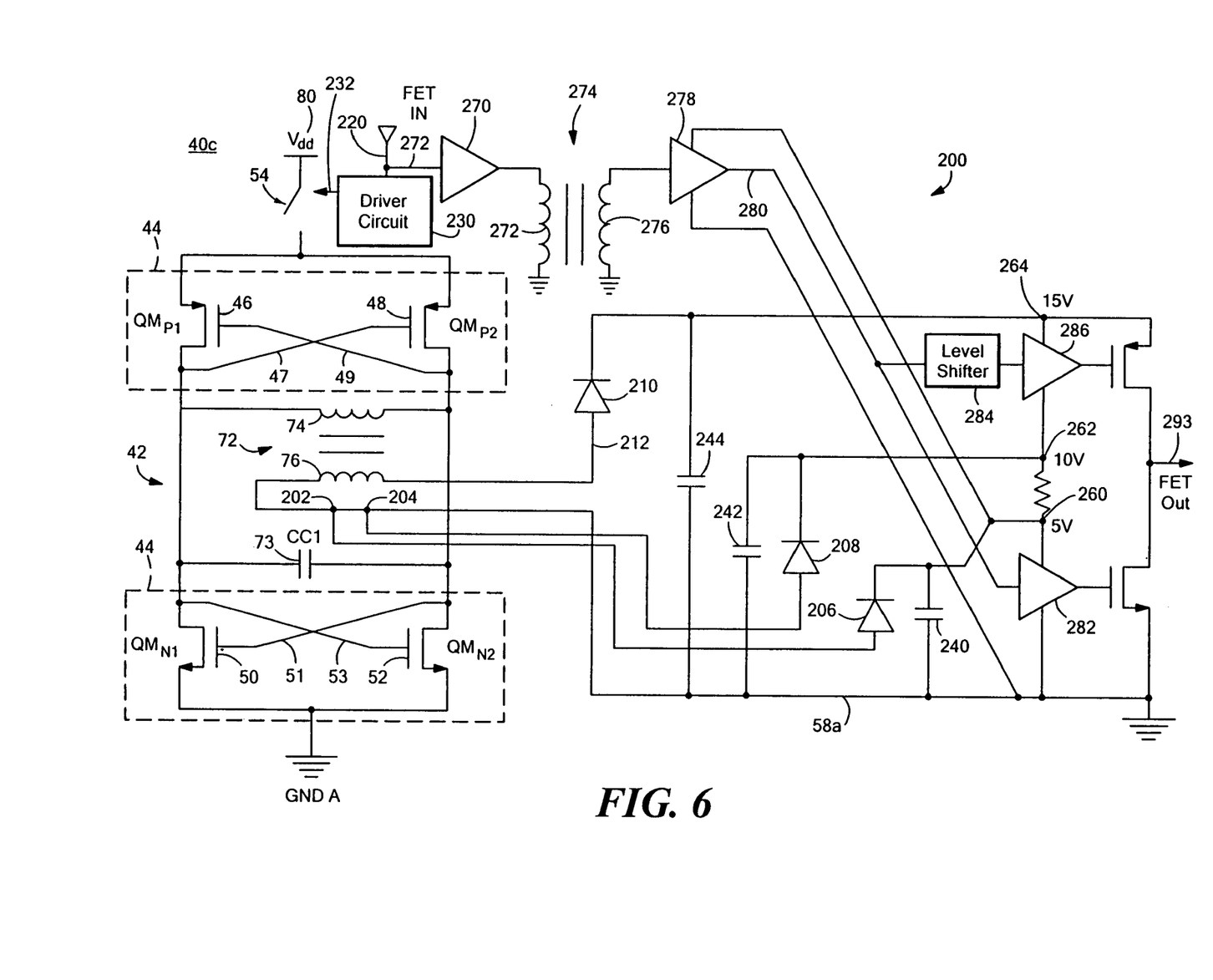
FIG. 6 is a circuit diagram of one embodiment of the power converter system of this invention that includes a feedforward circuit and a switching circuit that are both responsive to input data signals and that employs a feedforward circuit.

Power converter system 40c, FIG. 6, where like parts have been given like numbers, includes oscillator drive circuit 44 and LC oscillator circuit 42 that operate similar as described above. System 40c also includes micro-transformer 72 with primary winding 74 and secondary winding 76 that is center tapped at 202 and 204 to multi-level rectifier circuit 58a. Multi-level rectifier circuit 58a typically includes forward biased diodes 206, 208, and 210 connected in parallel to capacitors 240, 242, and 244, respectively. In this design, system 40c includes signal isolation circuit 200 that includes second transformer 272, e.g. an isolation transformer or a micro-transformer as described above. Signal isolation circuit 200 is responsive to an input data signal on line 220, such as an FET drive signal (FET IN) or any type of input data signal known to those skilled in the art. System 40c also includes feedforward driver circuit 230 responsive to the input data signal on line 220 that determines a predetermined output voltage to be generated by rectifier circuit 58a, e.g. 5V, 10V, 15V, and the like, based on the frequency of the input data signal on line 220 by enabling switching circuit 54 for a predetermined amount of time to achieve the desired output voltage. When the frequency of the input data signal on line 220 is high, switching circuit 54 is enabled longer and more power is modulated to secondary winding 76 and to rectifier circuit 58a, as described above. Similarly, when the frequency of the input data signal on line 220 is low, switching circuit 54 is enabled for a shorter amount of time, resulting in less power being generated by rectifier circuit 58a. As discussed above, switching circuit 54 is typically connected to an input voltage Vdd 80 and controls the duty cycle of oscillator drive circuit 44 to modulate power in LC oscillator circuit 42 to rectifier circuit 58a.

Signal isolator circuit 200 typically includes encoder 270 responsive to the input data signals by line 272. Encoder 270 provides an encoded signal to primary winding 272 of secondary micro-transformer 274. The encoded signal on primary winding 272 is transferred to secondary winding 276. Decoder 278 receives the decoded data signals and generates a decoded signal on line 280 that is input to amplifier 282 and level shifter 284. Amplifier 286 amplifies the output of level shifter 284. Level shifter 284 and amplifier 286 shift the voltage output by decoder 278 by line 280 from a range of about 0V to 5V to a range of about 10V to 15V. The resulting output signal, e.g. FET OUT, indicated at 293, is a delayed version of the FET IN, and is typically about 15 volts. Thus, system 40c provides for both power and data transfer across an isolation barrier.

Figure 7:
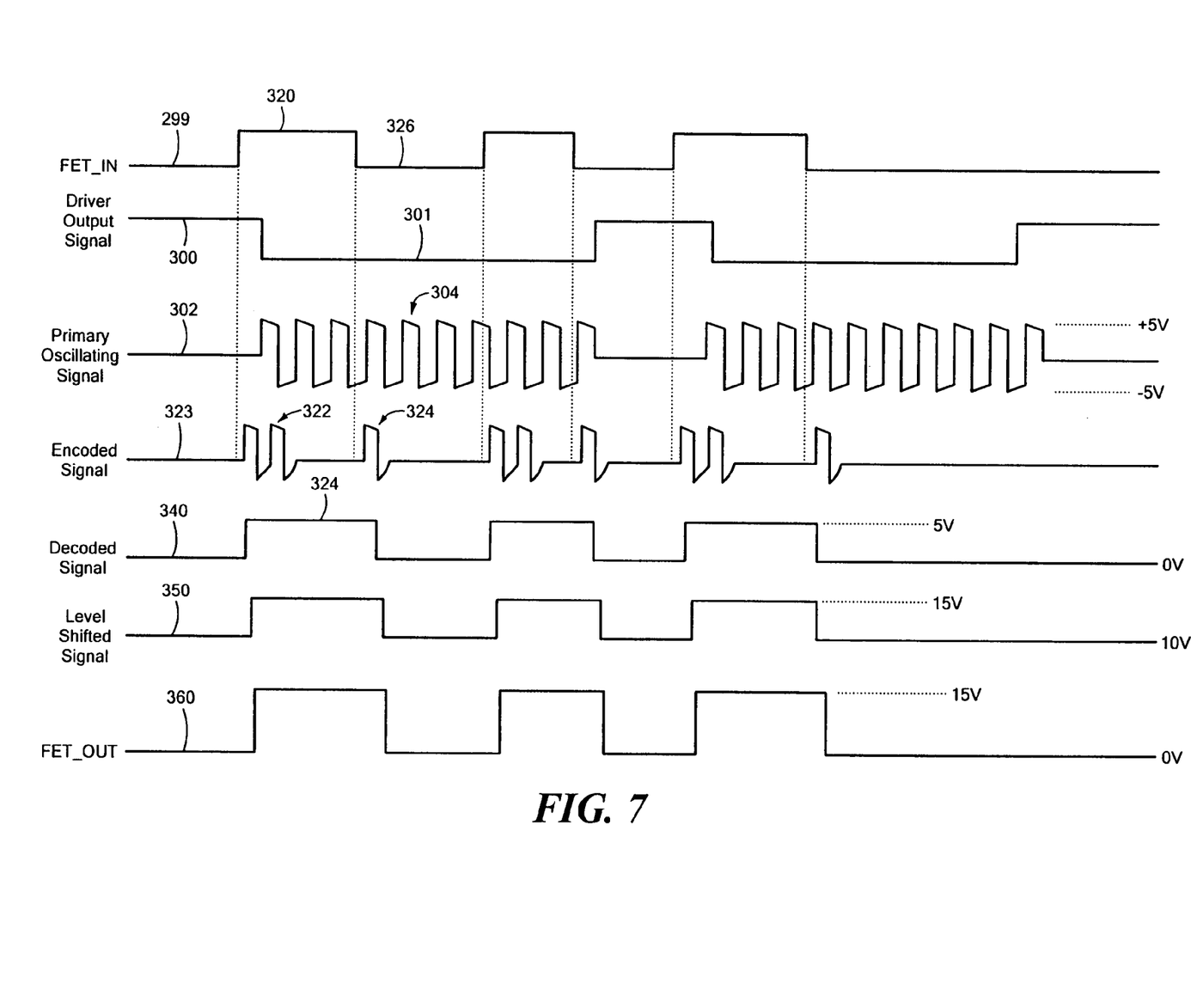
FIG. 7 shows various waveforms generated by the power converter system shown in FIG. 6.

The operation of power converter system 40c is described below with reference to the waveforms shown in FIG. 7. An example of the input data signal, FET IN on line 220, FIG. 6, input to encoder 270 and feedforward driver circuit 230 is shown by FET IN signal 299, FIG. 7. An example of the output signal generated by feedforward driver circuit 230 that controls switching circuit 54 is shown by driver output signal 300. Driver output signal 300 is typically inverted, delayed, and one-half the period of FET IN signal 299. In operation, when driver output signal 300 is a logical low, indicated at 301, switching circuit 54 is closed and oscillator drive circuit 44 enables LC oscillator circuit 42 to oscillate at high frequencies, e.g., about 10 to 100 MHz and between about +5V and −5V, to prevent saturation of micro-transformer 72 as discussed above and to modulate power to secondary winding 76 of micro-transformer 72. An example of the oscillating signals generated by LC oscillating circuit 42 on primary winding 74 is shown by pulse train 304 of primary oscillating signal 302. Pulse train 304 of primary oscillating signal 302 is modulated to secondary winding 76 that is center tapped to multi-level rectifier 58a with forward biased diodes 206-210 connected in parallel to capacitors 240-244 that provide regulated voltages at nodes 260, 262, 264, e.g., 5V, 10V and 15V, respectively. When FET IN signal 299 is a logical high, indicated at 320 on FET IN signal 299, encoder 270 generates dual pulses 322 of encoded signal 323. Dual pulses 322 generated by decoder 278 are transferred across primary winding 272 of micro-transformer 274 to secondary winding 276 and to decoder 278. Decoder 278 generates decoded output signal 340 that has logical high 342 that is between about 0V and 5V. Level shifter 284 shifts the output of decoded output signal 340 from about 0V and 5V to about 10V and 15V, as shown by level shifted signal 350. The resulting FET output signal 360 is the combination of decoded signal 340 and level shifted signal 350 and is typically between about 0V and 15V.

Figure 8:
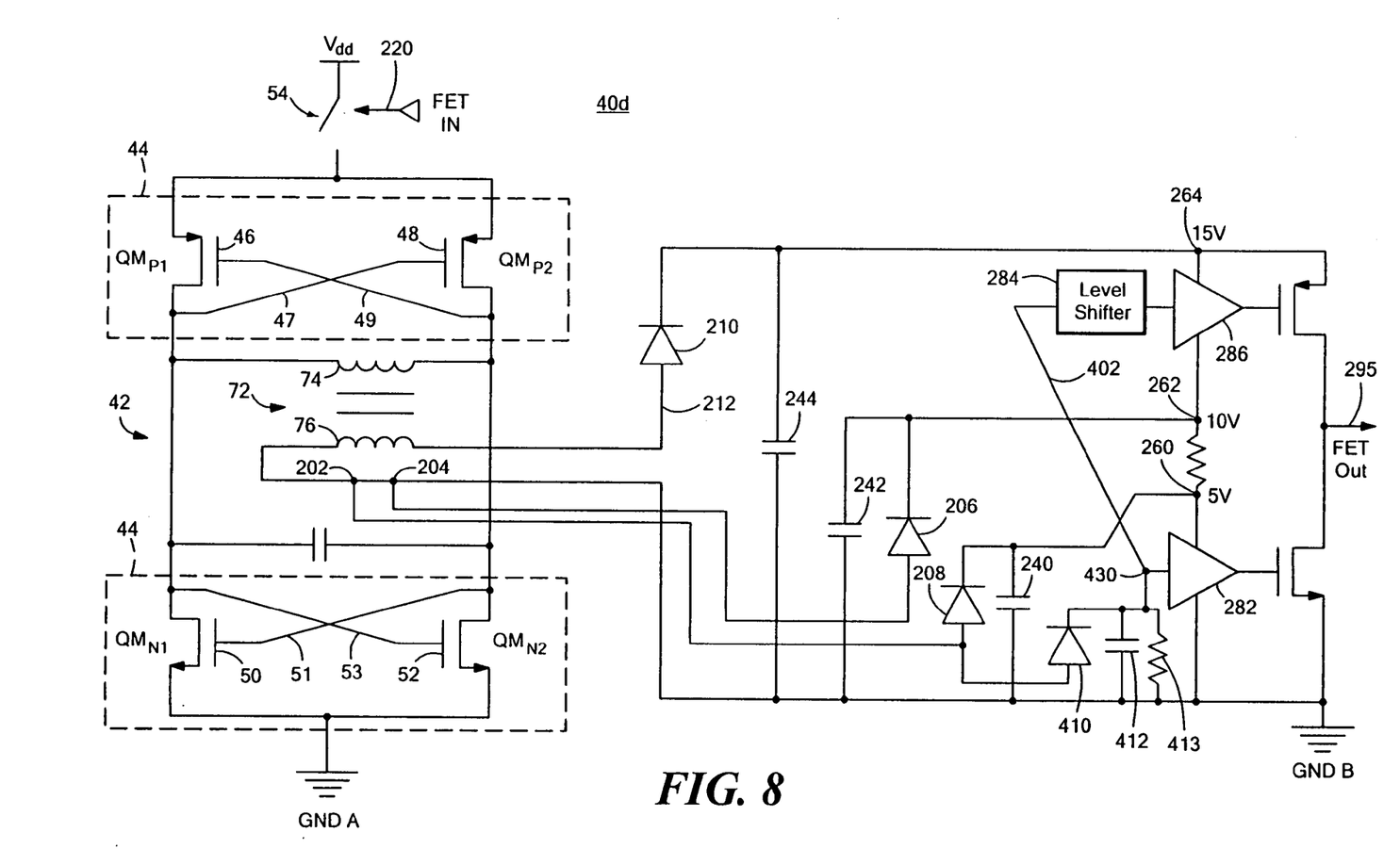
FIG. 8 is a circuit diagram of yet another embodiment of the power converter system of this invention in which the feedforward circuit shown in FIG. 6 is eliminated.

Power converter system 40d, FIG. 8, where like parts have been given like numbers, is of similar design as power converter system 40c, FIG. 6, and is similarly responsive to an input data signal by line 220. However, in this design, signal isolator circuit 200 as shown in FIG. 6 is eliminated. The input data signal on line 220, FIG. 8 is transferred from primary winding 74 of transformer 72 to secondary winding 76. In this example, switching circuit 54 is directly controlled by the input data signals on line 220. The on/off state of switching circuit 54 is determined by the logic state of the input signal, e.g., if switching device 54 includes a PMOS device, a logical high turns switching device 54 on and a logical low turns switching device 54 off. Similarly as described with reference to FIG. 6, secondary winding 76 is center tapped at 202 and 204 and connected to rectifier 58a with forward biased diodes 206-208 connected in parallel to capacitors 240-244, respectively. Secondary winding 76 is also connected to an additional forward biased diode 410 with associated parallel capacitance 412 and resistor 413. Forward biased diodes 206-208 and 410 with capacitors 240-244 and 412 provide regulated voltage outputs at nodes 260, 262 and 264 at predetermined voltages, e.g., 5V, 10V and 15V. The +5V voltage at node 430 drives resistive load 413 and is also provided to level shifter 284 by line 402. Amplifier 286 provides voltages between 10V and 15V. Amplifier 282 is also responsive to the voltage at node 430 and generates an output voltage between about 0V and 5V. Thus, system 40d transfers both power and input data signals across an isolation barrier.

Figure 9:
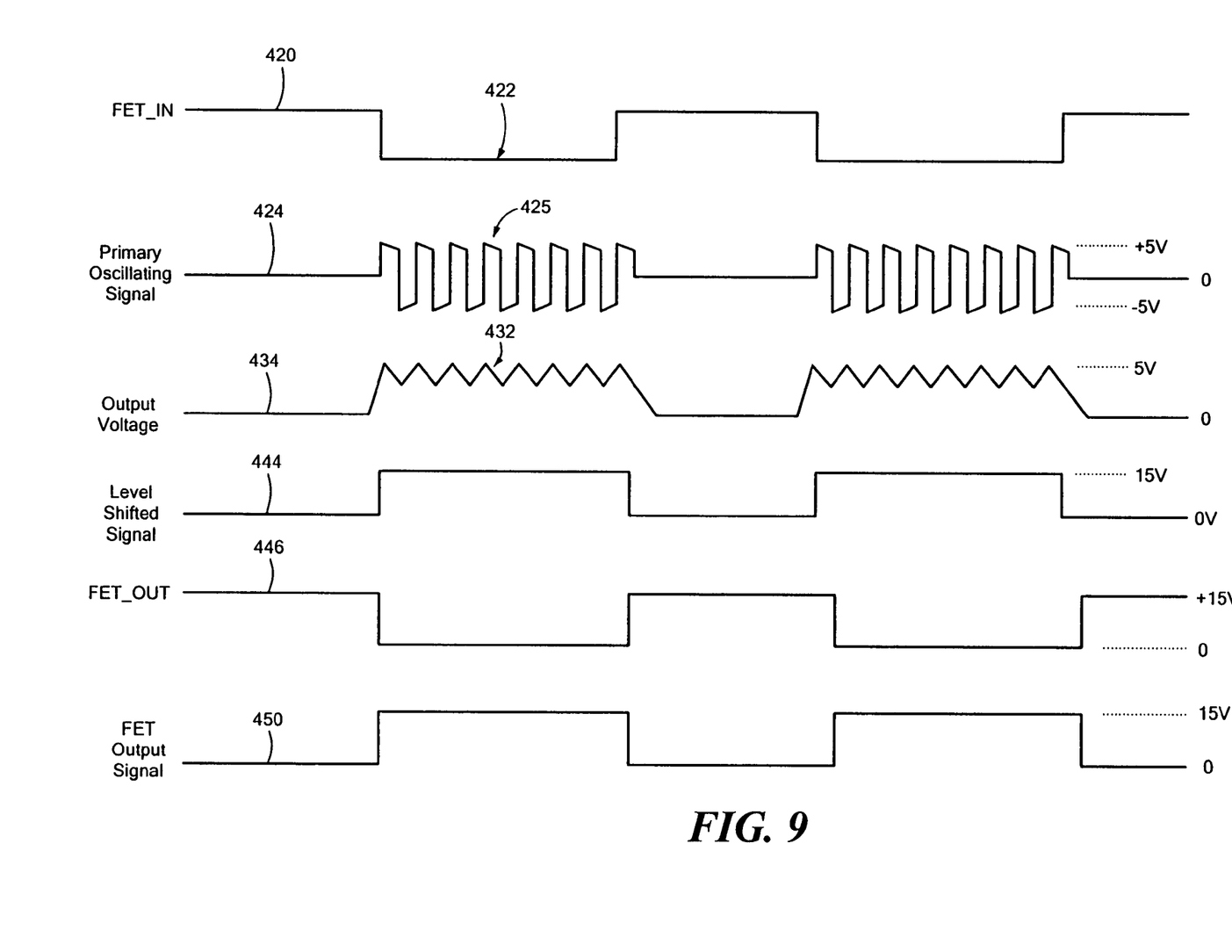
FIG. 9 shows various wave forms generated by the power converter system shown in FIG. 8.

The operation of power converter system 40d is now described with reference to the waveforms shown in FIG. 9. When FET IN signal on line 220, FIG. 8, is a logical low, as shown by logical low 422 of FET IN signal 420, switching circuit 54 is closed and oscillator drive circuit 44 enables LC oscillator circuit 42 to generate pulse train 425 of primary oscillating signal 424. Pulse train 425 is modulated to secondary winding 76 of micro-transformer 72 coupled to rectifier circuit 58a with forward biased diodes 208-210 and 410. The output voltage at node 430 is input to amplifier 282 that generates output voltage signal 434 that has a small ripple, as indicated at 432. The voltage at node 430 is input to level shifter 286 that generates level shifted signal 444 that is between about 0V and 15V. An example of the FET output on line 295 is shown by FET output signal 446. The resulting FET output signal is between about 15V and 0V. The output of amplifier 282 is shown by FET output signal 450.

Figure 10:
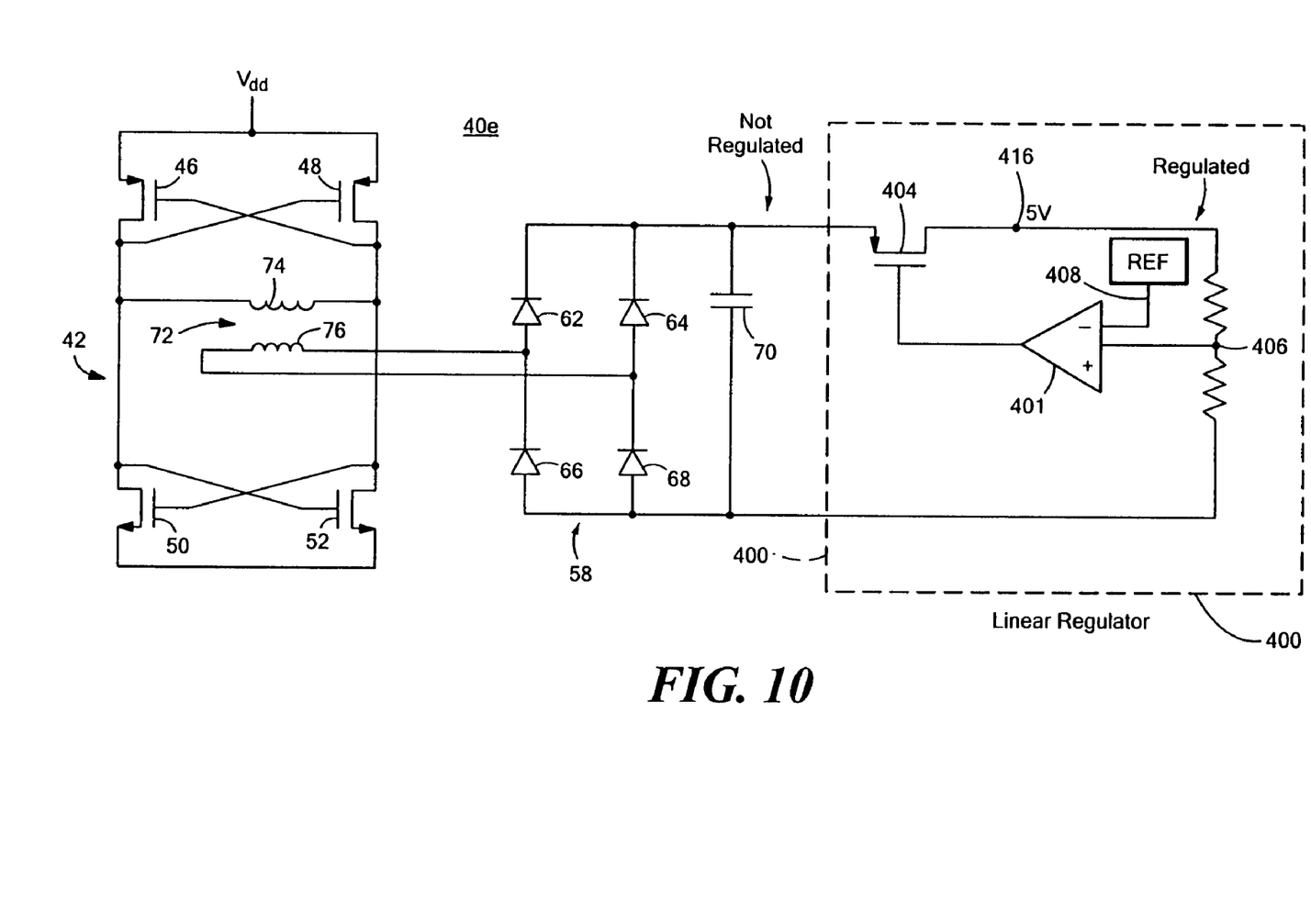
FIG. 10 is a circuit diagram of one embodiment of the power conversion system of this invention employing a linear regulator.

Power converter system 40e, FIG. 10, where like parts have been given like numbers, includes linear regulator 400 that includes comparator 401 that compares a scalable output voltage at node 406 with a predetermined reference voltage, e.g., 5V on line 408. Linear regulator 400 also includes switch 404 responsive to comparator 401 that regulates the output voltage at node 416.

Figure 11:
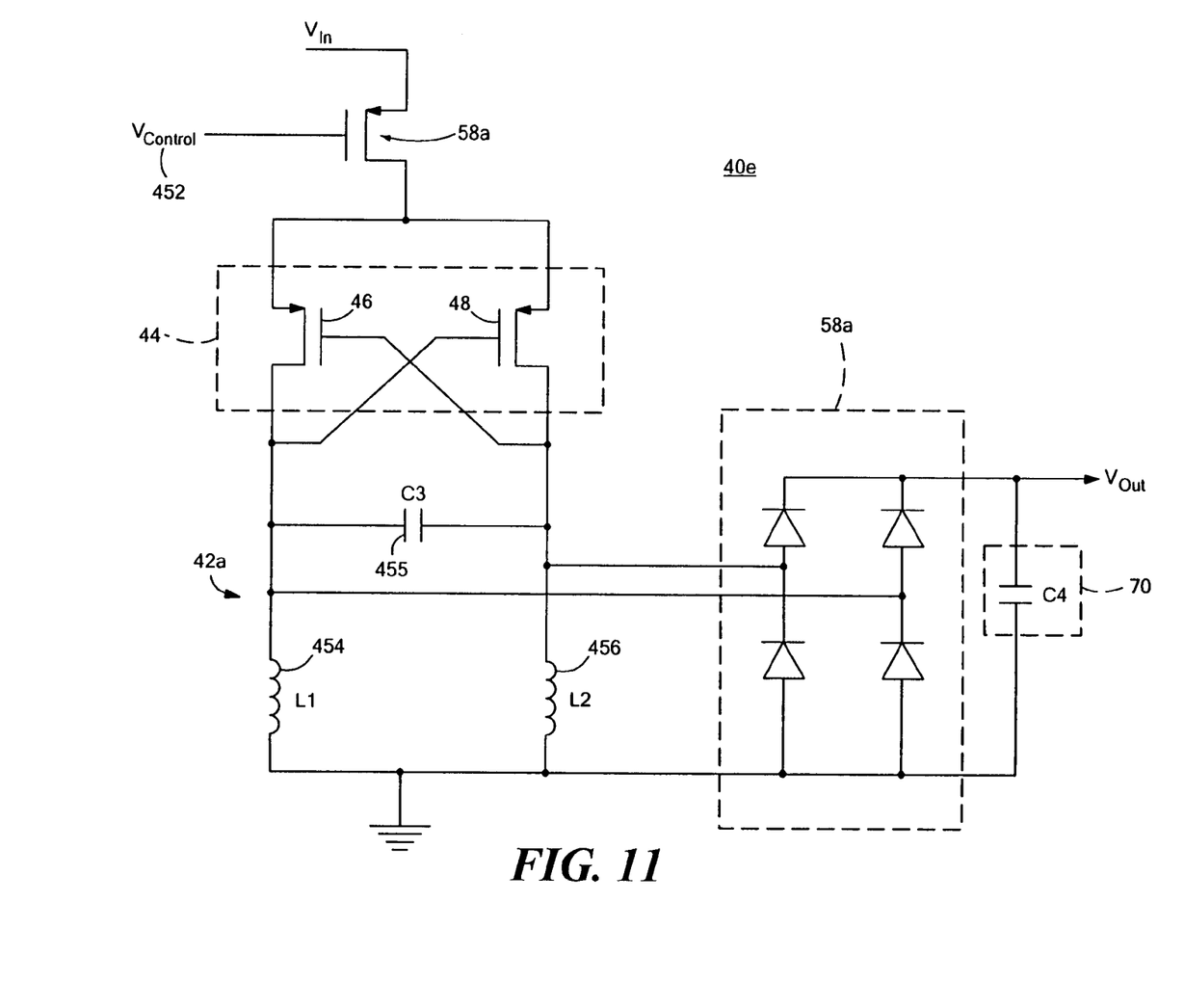
FIG. 11 is a circuit diagram showing one embodiment of a power converter system of this invention which is non-isolated.

Power converter system 40e, FIG. 11, where like parts have been given like numbers, is an example of a non-isolated power converter system in accordance with this invention. System 40e includes switching circuit 54a, e.g., a MOSFET or similar type device that is controlled by an input voltage, VCONTROL, indicated at 452 to drive oscillator drive circuit 44 that enables and disables LC oscillator circuit 42a. LC oscillator circuit 42a includes inductors 454 and 456 and capacitor 455. LC oscillator circuit 42a is coupled to rectifier circuit 58 and filter 70 and functions similar as described above.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A power converter system comprising:
   a first transformer having a primary winding and a secondary winding;
   an LC oscillator circuit comprising a capacitor connected in parallel to an inductance source, wherein the primary winding of the first transformer is the inductance source;
   an oscillator drive circuit driving said LC oscillator circuit;
   a rectifier circuit coupled to said LC oscillator circuit for providing a DC output;
   a switching circuit, including transistor pairs coupled in a positive feedback configuration, controlling the duty cycle of said oscillator drive circuit to modulate the power in said LC oscillator circuit to said rectifier circuit;
   a second transformer coupled between the switching circuit and the rectifier circuit; and
   a driver circuit transmitting a signal across the second transformer controlling a switching of said switching circuit.

2. The power converter system of claim 1 in which the capacitance of said LC oscillator circuit includes the parasitic capacitance of said oscillator drive circuit.

3. The power converter system of claim 1 in which said oscillator drive circuit includes a pair of cross-coupled positive feedback switches.

4. The power converter system of claim 1 in which said rectifier circuit includes a rectifier.

5. The power converter system of claim 4 in which said rectifier circuit includes a capacitor filter.

6. The power converter system of claim 1 in which said switching circuit is driven in response to the output from said rectifier circuit.

7. The power converter system of claim 1 in which said rectifier circuit is coupled to said LC oscillator circuit by the transformer wherein the primary winding is connected to said oscillator drive circuit and the secondary winding is connected to said rectifier circuit.

8. The power converter system of claim 7 in which said transformer is an isolation transformer.

9. The power converter system of claim 8 in which said transformer is a micro-transformer.

10. The power converter system of claim 9 in which said micro-transformer, said LC oscillator circuit, said oscillator drive circuit, and said switching circuit are on an integrated circuit chip.

11. The power converter system of claim 9 in which said micro-transformer and said rectifier circuit are on an integrated circuit chip.

12. The power converter system of claim 9 in which said micro-transformer is an air-core micro-transformer.

13. The power converter system of claim 12 in which said micro-transformer has at least one winding formed over a substrate.

14. The power converter system of claim 1 in which said LC oscillator circuit operates at its resonant frequency.

15. The power converter system of claim 1 in which said oscillator drive circuit includes two pairs of cross-coupled, positive feedback switches.

16. A power converter system comprising:
   an LC oscillator circuit;
   an oscillator drive circuit for driving said LC oscillator circuit;
   a transformer including a primary winding that includes the inductance of said LC oscillator circuit;
   a switching circuit, including transistor pairs coupled in a positive feedback configuration for controlling the duty cycle of said oscillator drive circuit to modulate the power in said LC oscillator circuit to a secondary winding of said transformer;

a second transformer coupled between the switching circuit and a rectifier circuit; and a driver circuit transmitting a signal across the second transformer controlling a switching of said switching circuit.

17. The power converter system of claim 16 in which the capacitance of said LC oscillator circuit includes the parasitic capacitance of said oscillator drive circuit.

18. The power converter system of claim 16 in which said oscillator drive circuit includes a pair of cross-coupled positive feedback switches.

19. The power converter system of claim 16 further including a rectifier circuit coupled to said secondary winding of said transformer.

20. The power converter system of claim 19 in which said rectifier circuit includes a capacitor filter.

21. The power converter system of claim 19 in which said switching circuit is driven in response to the output from said rectifier circuit.

22. The power converter system of claim 16 in which said transformer is an isolation transformer.

23. The power converter system of claim 16 in which said transformer is a micro-transformer.

24. The power converter system of claim 23 in which said micro-transformer, said LC oscillator circuit, said oscillator drive circuit, and said switching circuit are on an integrated circuit chip.

25. The power converter system of claim 23 in which said micro-transformer is an air-core micro-transformer.

26. The power converter system of claim 23 in which said micro-transformer has at least one winding formed over a substrate.

27. The power converter system of claim 23 in which said micro-transformer includes a center tapped secondary winding connected to said rectifier.

28. The power converter system of claim 16 in which said LC oscillator circuit operates at its resonant frequency.

29. The power converter system of claim 16 in which said oscillator drive circuit includes two pairs of cross-coupled positive feedback switches.

30. The power converter system of claim 16 in which said switching circuit is responsive to an input data signal.

31. The power converter system of claim 30 further including a feedback circuit coupled between said secondary winding of said transformer and said switching circuit.

32. The power converter system of claim 31 in which said feedback circuit is coupled to said secondary winding through said rectifier circuit.

33. The power converter system of claim 32 in which said feedback circuit includes a fixed frequency pulse width modulator generator.

34. The power converter system of claim 31 in which said rectifier is a multi-level rectifier.

35. The power converter system of claim 32 in which said feedback circuit includes a comparator circuit for comparing the output of said rectifier circuit with a reference signal to determine fluctuations in said rectifier circuit output.

36. The power converter system of claim 35 in which said feedback circuit includes a second transformer.

37. The power converter system of claim 36 in which said feedback circuit includes an encoder responsive to said input data signal connected between the output of said comparator circuit and a primary winding of said second transformer and a decoder connected between a secondary winding of said second transformer and said switching circuit.

38. The power converter system of claim 36 in which said second transformer is an isolation transformer.

39. The power converter system of claim 38 in which second transformer is a micro-transformer and said second transformer is on an integrated circuit chip.

40. The power converter system of claim 39 in which said second micro-transformer is an air-core micro-transformer.

41. The power converter system of claim 40 in which said second micro-transformer has at least one winding formed over a substrate.

42. The power converter system of claim 16 further including a signal isolator circuit having a second transformer responsive to an input data signal.

43. The power converter system of claim 42 in which said second transformer is an isolation transformer.

44. The power converter system of claim 43 in which said second transformer is a micro-transformer.

45. The power converter system of claim 44 in which said second micro-transformer is an air-core micro-transformer.

46. The power converter system of claim 45 in which said signal isolator circuit includes an encoder responsive to said input data signal connected to a primary winding of said second transformer and a decoder connected to a secondary winding of said second transformer and a comparator.

47. The power converter system of claim 44 in which said second micro-transformer has at least one winding formed over a substrate.

48. The power converter system of claim 16 in which said switching circuit is driven by an input data signal that is transferred to said secondary winding of said transformer.

49. The power converter system of claim 16 further including a linear regulator circuit connected to the output of said rectifier.

50. The power converter system of claim 49 in which said linear regulator includes a comparator for comparing the output voltage to a predetermined reference voltage ad a switch responsive to said comparator to regulate the output voltage.

51. The power converter system of claim 16 in which said power converter system is a non-isolated system.

52. A power converter system comprising:
an LC oscillator circuit;
an oscillator drive circuit for driving said LC oscillator circuit;
a transformer including a primary winding that includes the inductance of said LC oscillator circuit;
a switching circuit for controlling the duty cycle of said oscillator drive circuit to modulate the power in said LC oscillator circuit to a secondary winding of said transformer;
a signal isolator circuit having a second transformer responsive to an input data signal; and
a feedforward driver circuit responsive to said input data signal for determining a predetermined output voltage generated by said rectifier circuit based on the frequency of said input signal and enabling said switching circuit for a predetermined amount of time required to achieve said predetermined output voltage.

53. The power converter system of claim 52 in which said input data signal includes a FET drive signal.

* * * * *